United States Patent
Kambayashi

(10) Patent No.: US 10,920,716 B2
(45) Date of Patent: Feb. 16, 2021

(54) HYBRID VEHICLE

(71) Applicant: Toyota Jidosha Kabushiki Kaisha, Toyota (JP)

(72) Inventor: Taku Kambayashi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 16/675,969

(22) Filed: Nov. 6, 2019

(65) Prior Publication Data
US 2020/0208593 A1    Jul. 2, 2020

(30) Foreign Application Priority Data

Dec. 28, 2018 (JP) .................. 2018-246892

(51) Int. Cl.
*F02M 25/08* (2006.01)
*B60W 20/15* (2016.01)
*B60K 15/063* (2006.01)
*B60K 15/035* (2006.01)

(52) U.S. Cl.
CPC ..... *F02M 25/089* (2013.01); *B60K 15/03519* (2013.01); *B60K 15/063* (2013.01); *B60W 20/15* (2016.01)

(58) Field of Classification Search
CPC ............ F02M 25/089; B60K 15/063; B60K 15/03519; B60W 20/15
See application file for complete search history.

(56) References Cited

U.S. PATENT DOCUMENTS 9,512,791 B1 * 12/2016 Dudar .................. F02M 25/089
2011/0308501 A1 * 12/2011 Sato ..................... F02D 19/0605
                                                            123/520
2015/0047350 A1 * 2/2015 Pursifull ............. F02D 19/0647
                                                            60/611

FOREIGN PATENT DOCUMENTS

JP        2011-084088 A     4/2011

OTHER PUBLICATIONS

JPH0932671—Feb. 1997, Butsuchi et al., machine translation.*

* cited by examiner

Primary Examiner — Hai H Huynh
Assistant Examiner — Diem T Tran
(74) Attorney, Agent, or Firm — Dinsmore & Shohl LLP

(57) ABSTRACT

In a hybrid vehicle, a power control unit configured to control an engine and a motor, and a vaporized gas control valve are disposed in an engine compartment located in a front portion of the vehicle. The vaporized gas control valve is disposed on a purge pipe that introduces fuel-vaporized gas generated in a fuel tank into the engine, to adjust flow of the fuel-vaporized gas. The power control unit is stored within a casing, and the vaporized gas control valve is disposed on a top portion of a side wall of the casing.

11 Claims, 4 Drawing Sheets

HYBRID VEHICLE

CROSS REFERENCE TO RELATED APPLICATION

This application claims priority to Japanese Patent Application No. 2018-246892 filed on Dec. 28, 2018, which is incorporated herein by reference in its entirety including the specification, claims, drawings, and abstract.

TECHNICAL FIELD

The present disclosure relates to a structure of a hybrid vehicle, and more particularly to a structure within an engine compartment in a front portion of a vehicle.

BACKGROUND

In a fuel tank, fuel is vaporized to generate fuel-vaporized gas. The fuel-vaporized gas is suctioned to a canister. To operate an engine, the fuel-vaporized gas is released from the canister and introduced through a purge pipe into an intake manifold of the engine, where the fuel-vaporized gas is burned. The purge pipe includes a vaporized gas control valve for adjusting an amount of the fuel-vaporized gas to be introduced into the engine.

The vaporized gas control valve is often disposed within an engine compartment in the front portion of a vehicle. For example, a structure including a vaporized gas control valve behind the engine has been suggested (see JP 2011-84088 A, for example). The vaporized gas control valve, which is associated with the engine, may be disposed near the engine.

SUMMARY

In recent years, hybrid vehicles that are driven by an engine and a motor are widely in use. A hybrid vehicle often includes a power control unit that controls a hybrid system within an engine compartment in the front portion of the vehicle. The power control unit may be damaged by the vaporized gas control valve in a collision, depending on the position of the vaporized gas control valve.

An embodiment of the disclosure is therefore directed toward reducing damage of a power control unit caused by a vaporized gas control valve in a collision in a hybrid vehicle.

A hybrid vehicle of the disclosure includes an engine compartment located in a front portion of the vehicle. The engine compartment includes a power control unit configured to control an engine and a motor, and a vaporized gas control valve. The vaporized gas control valve is disposed on a purge pipe that introduces fuel-vaporized gas generated in a fuel tank into the engine, to adjust flow of the fuel-vaporized gas. The power control unit is stored within a casing, and the vaporized gas control valve is disposed on a top portion of a side wall of the casing.

The side walls of the casing have greater strength along the height of the vehicle than other portions of the casing. Therefore, even when the hood covering the top surface of the engine compartment interferes with the vaporized gas control valve in a collision to cause application of a collision load to the side wall of the casing, the casing having such strength reduces damage to the power control unit stored in the casing.

In the hybrid vehicle of the disclosure, the engine may be adjacent to the casing storing the power control unit along a width of the vehicle in the engine compartment and may be disposed such that a top surface of the engine is located higher than a top surface of the casing. The vaporized gas control valve may be disposed on a top portion of the side wall of the casing closer to the engine.

This arrangement allows the vaporized gas control valve to be disposed in a space formed by the hood, the engine, and the casing, to thereby prevent the vaporized gas control valve from being depressed directly by the hood in a frontal crash. This structure reduces damage to the power control unit by the vaporized gas control valve in a frontal crash.

In the hybrid vehicle of the disclosure, damage of the power control unit caused by the vaporized gas control valve in a collision can be reduced.

BRIEF DESCRIPTION OF DRAWINGS

Embodiment(s) of the present disclosure will be described based on the following figures, wherein.

DESCRIPTION OF EMBODIMENTS

An embodiment of a hybrid vehicle 100 will be described below by reference to the drawings. In FIG. 1 to FIG. 4, an arrow FR, an arrow UP, and an arrow RH indicate the forward direction (traveling direction), the upward direction, and the rightward direction of a vehicle, respectively. Directions opposite to these arrows FR, UP, and RH indicate the rearward direction, the downward direction, and the leftward direction of the vehicle, respectively. In the following description, unless otherwise specified, forward and rearward, leftward and rightward, and upward and downward refer to forward and rearward along the length of a vehicle, leftward and rightward along the width of the vehicle, and upward and downward along the height of the vehicle, respectively.

Figure 1:
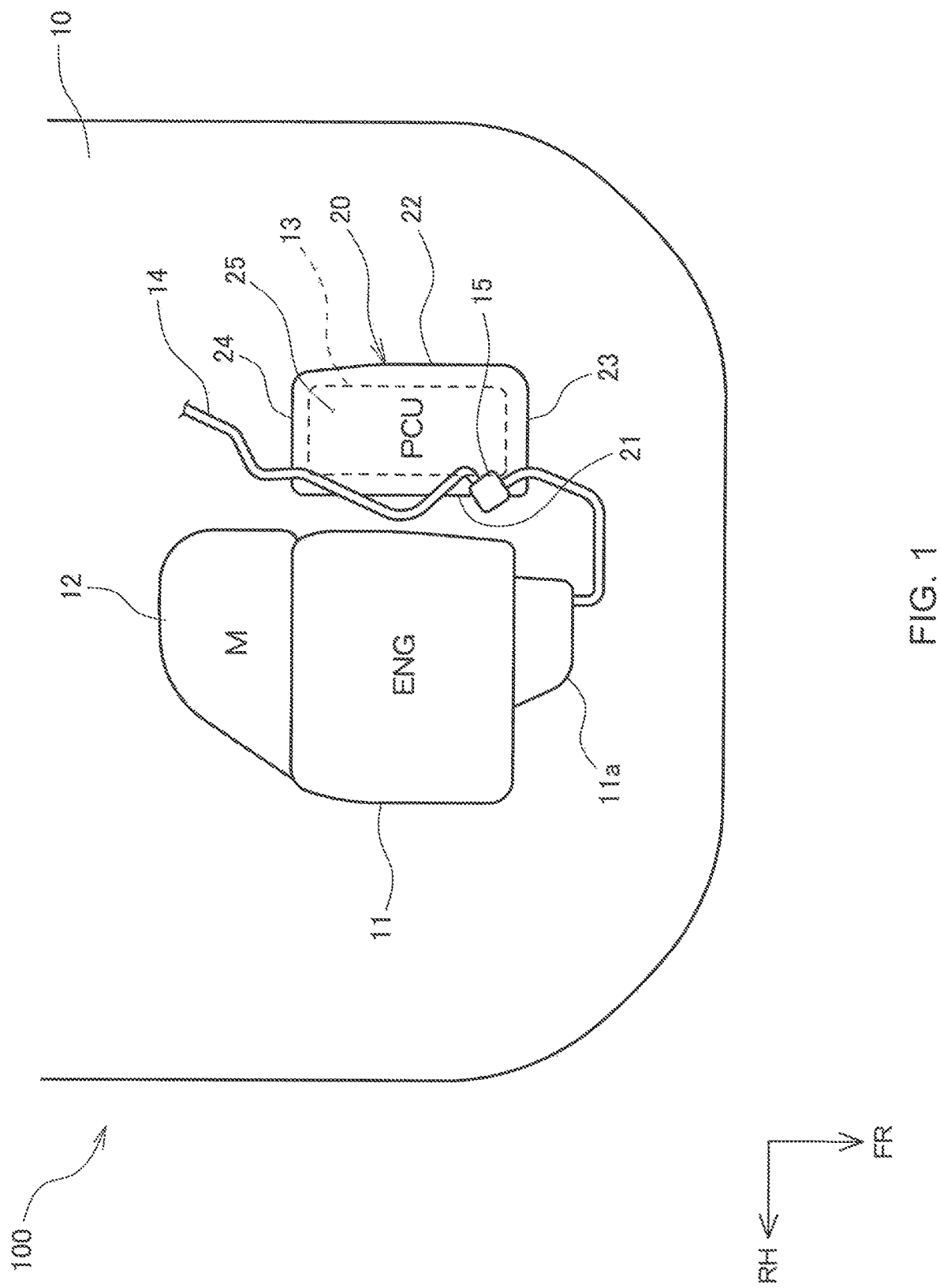
FIG. 1 is a plan view of an engine compartment of a hybrid vehicle according to an embodiment.
Figure 2:
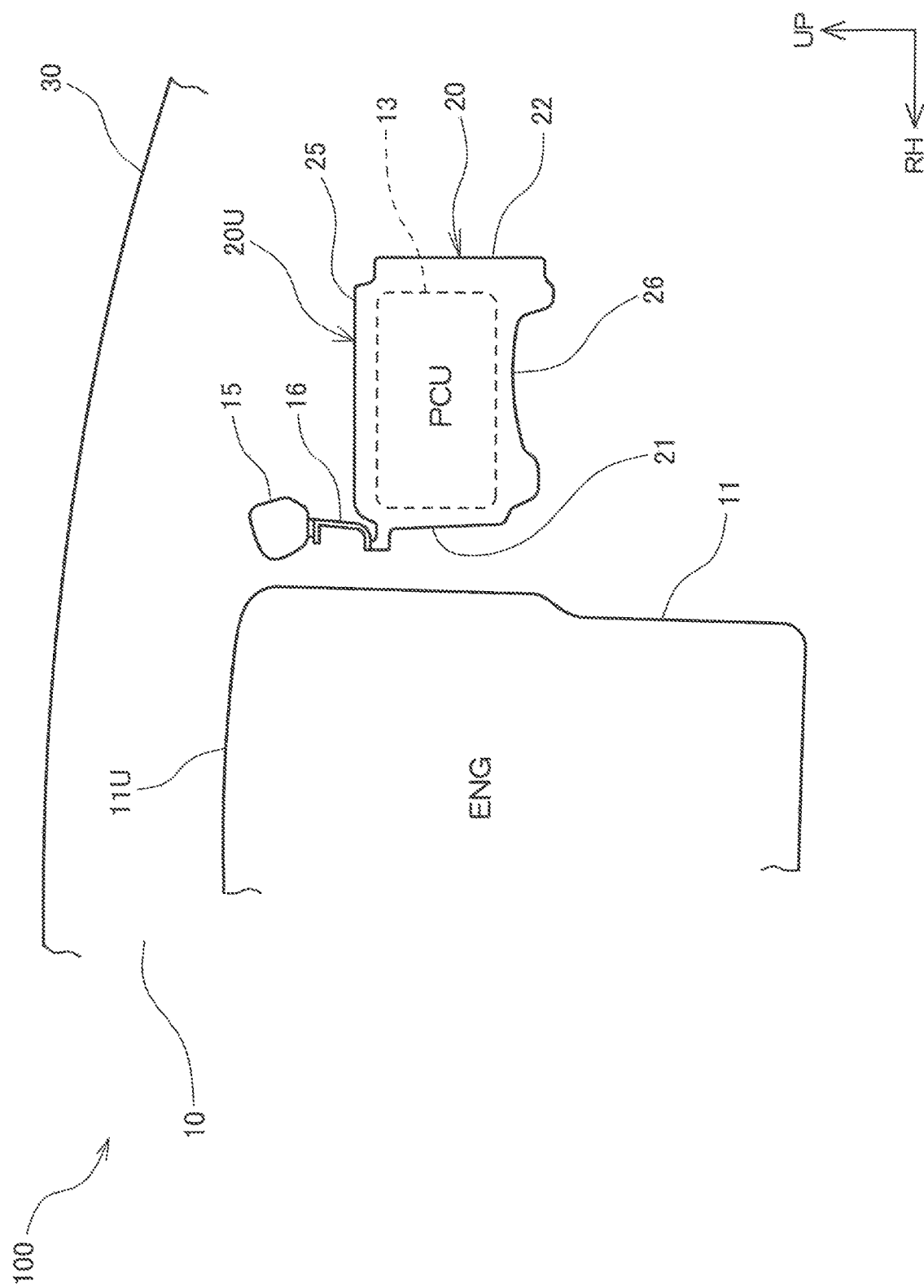
FIG. 2 is an elevation of the engine compartment of the hybrid vehicle according to the embodiment.

As illustrated in FIG. 1, the hybrid vehicle 100 of the embodiment includes an engine compartment 10 in a front portion thereof. The engine compartment 10 houses an engine 11 and a motor 12, a power control unit 13 stored in a casing 20, and a vaporized gas control valve 15. As illustrated in FIG. 2, a hood 30 covers the upper side of the engine compartment.

As illustrated in FIGS. 1 and 2, the casing 20 storing the power control unit 13 is a box shape member having opposite side walls 21 and 22 along the width of the vehicle, opposite side walls 23 and 24 along the length of the vehicle, and a bottom plate 26 and a top plate 25. The side walls 21 to 24 have a greater strength along the height of the vehicle than other portions of the casing. The top plate 25 has a top surface which forms a top surface 20U of the casing 20.

The engine 11 is adjacent to the casing 20 along the width of the vehicle, and is disposed such that a top surface 11U of the engine 11 is located higher than the top surface 20U of the casing 20.

The power control unit 13 controls the engine 11 and the motor 12, and includes a high-voltage component.

The vaporized gas control valve 15 is disposed on a purge pipe 14 that introduces fuel-vaporized gas generated in a fuel tank into an intake manifold 11*a* of the engine 11, to adjust flow of the fuel-vaporized gas.

The vaporized gas control valve 15 is attached, via a bracket 16, to the top portion of the side wall 21 of the casing 20 closer to the engine 11 toward the front. The vaporized gas control valve 15 is raised above the casing 20 by the bracket 16. The bracket 16 has a base portion fixed to the side wall 21 of the casing 20.

Figure 3:
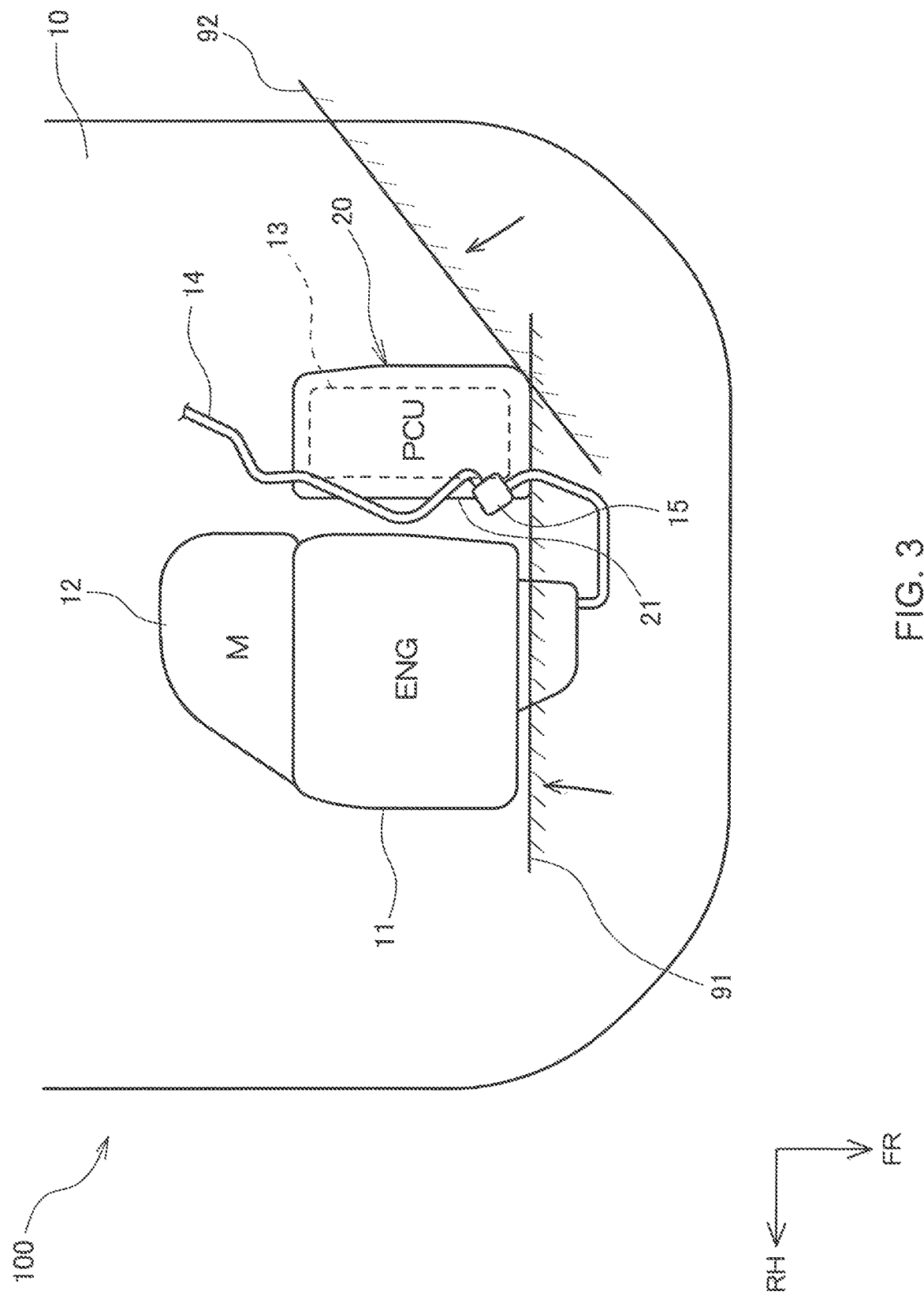
FIG. 3 is a plan view illustrating barrier intrusion in a head-on crash and barrier intrusion in a small overlap frontal crash of the hybrid vehicle illustrated in FIG. 1.

In a frontal crash of the hybrid vehicle 100, the vaporized gas control valve 15, which is disposed as described above, is not sandwiched between a barrier 91 and the casing 20 of the power control unit 13, as illustrated in FIG. 3. This structure prevents the casing 20 or the power control unit 13 from being damaged by the vaporized gas control valve 15 having high rigidity.

Similarly, in a left-turn crash, the vaporized gas control valve 15 is not sandwiched between a barrier 92 and the casing 20 of the power control unit 13, as illustrated in FIG. 3, which also prevents the casing 20 or the power control unit 13 from being damaged by the vaporized gas control valve 15 having high rigidity.

Figure 4:
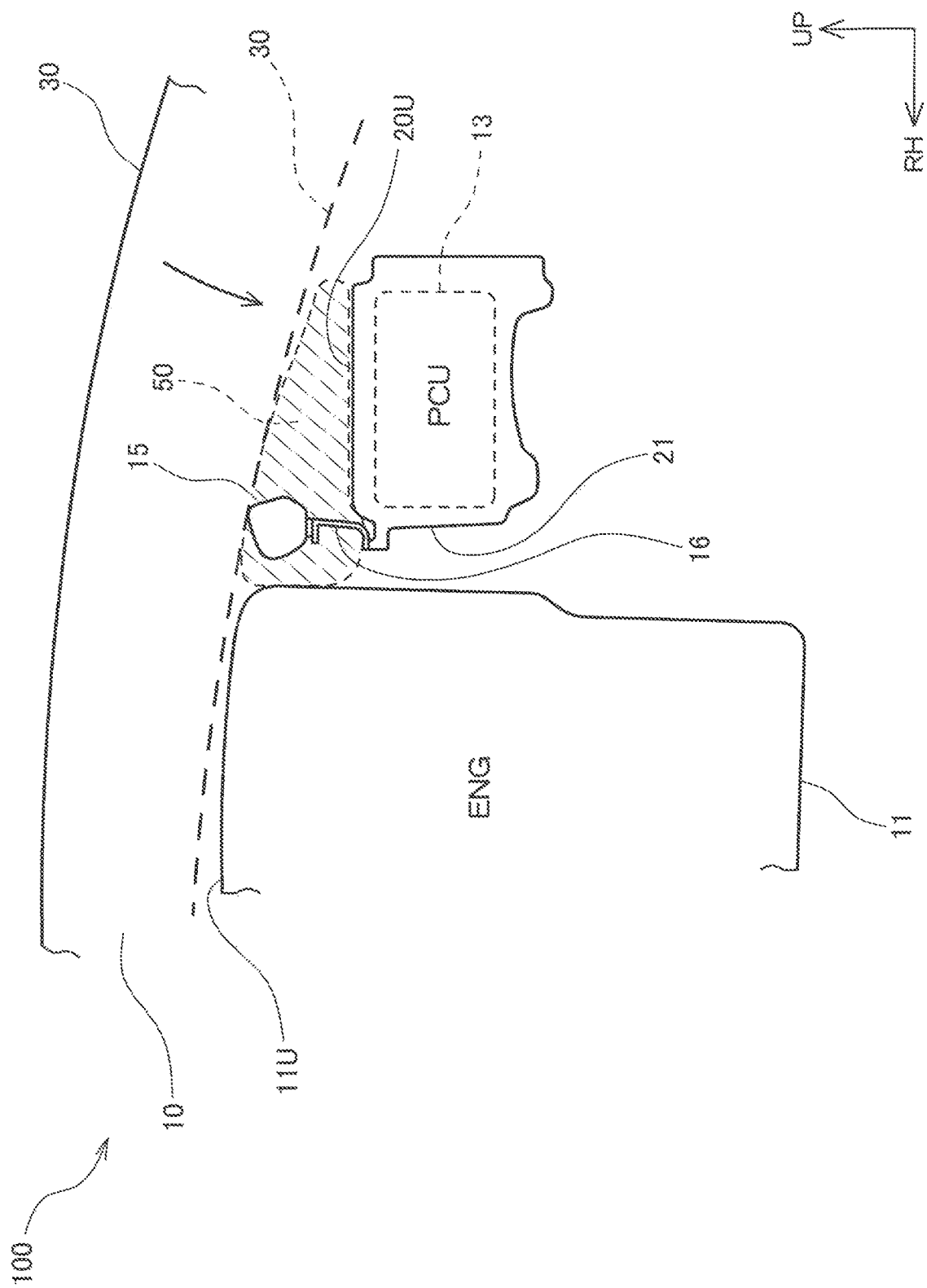
FIG. 4 is an elevation illustrating downward movement of a hood in a frontal crash of the hybrid vehicle illustrated in FIG. 1.

Further, when the hood 30 moves downward in a frontal crash of the hybrid vehicle 100, the vaporized gas control valve 15 is disposed within a space 50 formed by the hood 30, the engine 11, and the casing 20, as indicated by a dashed line in FIG. 4. It is therefore possible to prevent the hood 30 from interfering with the vaporized gas control valve 15 and depressing the vaporized gas control valve 15 directly downward upon collision. This structure further reduces damage to the power control unit 13 caused by the vaporized gas control valve 15 in a frontal crash.

Even when the hood 30 moves further downward from the state indicated by dashed line in FIG. 4 and interferes with the vaporized gas control valve 15, so that collision load is applied, via the bracket 16, to the side wall 21 of casing 20, damage to the power control unit 13 stored in the casing 20 can be regulated by the strength of the side wall 21. Further, even when the bracket 16 deforms by the collision load to cause the vaporized gas control valve 15 to interfere with the side wall 21 of the casing 20, damage to the power control unit 13 stored in the casing 20 can be regulated by the strength of the side wall 21.

As described above, the hybrid vehicle 100 according to the embodiment can reduce damage to the power control unit 13 caused by the vaporized gas control valve 15 in a collision.

While in the embodiment of the hybrid vehicle 100 described above, the vaporized gas control valve 15 is attached, via the bracket 16, to the side wall 21 of the casing 20 closer to the engine 11 toward the front at the top portion of the side wall 21, the disclosure is not limited to this embodiment. For example, the vaporized gas control valve 15 may be attached to top portion of the side wall 21 of the casing 20 toward the rear or may be attached to the top of the side wall 21 in the center portion in the vehicle length direction.

The invention claimed is:

1. A hybrid vehicle, comprising:
   an engine compartment located in a front portion of the hybrid vehicle,
   the engine compartment comprising:
      a power control unit configured to control an engine and a motor; and
      a vaporized gas control valve disposed on a purge pipe that introduces fuel-vaporized gas generated in a fuel tank into the engine, the vaporized gas control valve being configured to adjust flow of the fuel-vaporized gas, wherein the power control unit is stored within a casing, and
   the vaporized gas control valve is disposed on a top portion of a side wall of the casing,
   wherein the engine is adjacent to the casing storing the power control unit along a width of the hybrid vehicle in the engine compartment, the engine being disposed such that a top surface of the engine is located higher than a top surface of the casing, and
   wherein the vaporized gas control valve is disposed on a top portion of the side wall of the casing closer to the engine.

2. The hybrid vehicle according to claim 1, comprising:
   a hood covering the engine compartment, and
   wherein the vaporized gas control valve is provided in a space defined by the hood, the engine, and the casing power control unit.

3. The hybrid vehicle according to claim 1, comprising a bracket attaching the vaporized gas control valve to the casing.

4. A hybrid vehicle, comprising:
   an engine compartment located in a front portion of the vehicle,
   the engine compartment comprising:
      a power control unit configured to control an engine and a motor; and
      a vaporized gas control valve disposed on a purge pipe that introduces fuel-vaporized gas generated in a fuel tank into the engine, the vaporized gas control valve being configured to adjust flow of the fuel-vaporized gas, wherein
   the power control unit is stored within a casing, the casing includes a first side wall, a second side wall opposite the first side wall, a front wall, a rear wall opposite the front wall, a bottom plate, and a top plate opposite the bottom plate, the top plate forming a top surface of the casing, the first side wall being closer to the engine than the second side wall,
   the vaporized gas control valve is disposed on a top portion of the first side wall of the casing, and
   the first side wall, the second side wall, the front wall, and the rear wall each have a strength greater than the top plate and the bottom plate of the casing.

5. The hybrid vehicle according to claim 4, wherein the vaporized gas control valve is disposed on the first side wall and closer to the front wall of the casing than the rear wall of the casing.

6. The hybrid vehicle according to claim 4, wherein the vaporized gas control valve is disposed on the first side wall and closer to the rear wall of the casing than the front wall of the casing.

7. The hybrid vehicle according to claim 4, comprising
   a hood covering the engine compartment, and
   wherein the vaporized gas control valve is provided in a space defined by the hood, the engine, and the casing.

8. The hybrid vehicle according to claim 4, comprising a bracket attaching the vaporized gas control valve to the casing.

9. A hybrid vehicle, comprising:
   an engine compartment located in a front portion of the vehicle,
   the engine compartment comprising:
      a power control unit configured to control an engine and a motor; and a vaporized gas control valve disposed on a purge pipe that introduces fuel-vaporized gas generated in a fuel tank into the engine, the vaporized gas control valve being configured to adjust flow of the fuel-vaporized gas, wherein the power control unit is stored within a casing, the casing includes a first side wall, a second side wall opposite the first side wall, a front wall, a rear wall opposite the front wall, a bottom plate, and a top plate opposite the bottom plate, the top plate forming a top surface of the casing, the first side wall being closer to the engine than the second side wall, the vaporized gas control valve is disposed on a top portion of the first side wall of the casing, and the vaporized gas control valve is disposed on the first side wall and closer to the front wall of the casing than the rear wall of the casing.

10. The hybrid vehicle according to claim 9, comprising a hood covering the engine compartment, and wherein the vaporized gas control valve is provided in a space defined by the hood, the engine, and the casing.

11. The hybrid vehicle according to claim 9, comprising a bracket attaching the vaporized gas control valve to the casing.

* * * * *